United States Patent [19]

Agrawal et al.

[11] Patent Number: 5,991,629
[45] Date of Patent: Nov. 23, 1999

[54] CELLULAR NETWORKS WITH SPARE BASE AND SATELLITE STATIONS

[75] Inventors: Prathima Agrawal, New Providence; Ashok N. Rudrapatna, Basking Ridge, both of N.J.

[73] Assignee: AT&T Corp., New York, N.Y.

[21] Appl. No.: 08/943,291

[22] Filed: Oct. 14, 1997

[51] Int. Cl.$^6$ ............................................. H04M 11/00
[52] U.S. Cl. ...................... 455/446; 455/441; 455/432
[58] Field of Search ................................ 455/446, 445, 455/453, 436, 441, 422, 426, 432

[56] References Cited

U.S. PATENT DOCUMENTS

| 5,230,082 | 7/1993 | Ghisler et al. | |
| 5,422,930 | 6/1995 | McDonald et al. | 455/411 |
| 5,771,453 | 6/1998 | Haartsen | 455/449 |
| 5,861,844 | 1/1999 | Gilmore et al. | 455/423 |
| 5,878,349 | 3/1999 | Dufour et al. | 455/438 |

OTHER PUBLICATIONS

I. Rubin and C. W. Choi, "Impact of the Location Area Structure on the Performance of Signaling Channels in Wireless Cellular Networks", IEEE Communications Magazine, pp. 108–115.

B. Bornkamp, A. Kegel and Ramjee Prasad, "Uplink and Downlink Performance Analysis of a Cellular Radio System using Corner base Station and Directional Antennas", 1995 IEEE 45th Vehicular Technology Conference, Chicago, pp. 375–379, Jul. 25–28, 1995.

"Teletraffic Performance of Highway Microcells with Overlay Macrocell", S.A. El–Dolil, W–C Wong, R. Steele, IEEE Journal on Selected Areas in Communications, vol. 7, No. 1, Jan. 1989, pp. 71–78.

"Microcellular Communication Systems with Hierarchial Macrocell Overlays: Traffic Performance Models and Analysis", S.S. Rappaport, L–R Hu, Proceedings of the IEEE, vol. 82, No. 9, Sep. 1994, pp. 1383–1397.

"Minimizing Cellular Handover Failures Without Channel Utilization Loss", B. Narendran, P. Agrawal, D.K. Anvekar, Proceedings of IEEE Globecom, Nov. 1994, 7 pgs.

"Channel Management Policies for Handovers in Cellular Networks", P.Agrawal, D.K. Anvekar,B. Narendan, Bell Labs Technical Journal, Autumn 1996, pp. 97–110.

*Primary Examiner*—Paul Loomis

[57] ABSTRACT

A cellular network includes a control station and a network of base stations installed one per cell with which one or more mobile stations can communicate as they roam through a cell. Redundantly deployed spare base stations are introduced along with the primary base station at a central area of each cell. The redundantly deployed spare base stations handle new calls when the associated primary base station is overloaded, participate in retransmission of data lost due to degraded channel conditions and congestion in the network, and assist in handoffs. Primary and spare satellite stations are deployed in regions marked by hills or valleys to augment the communicative capabilities of the primary and spare base stations.

20 Claims, 7 Drawing Sheets

FIG. 3

MEMORY 36

| BS1 BUFFER (OK) | | | ASSIGNMENTS=2 |
|---|---|---|---|
| MOBILE STATION | M1 | M2 | |
| SIGNAL LEVEL | L11 | L12 | |
| BIT ERROR RATE | E11 | E12 | |

| SS1 BUFFER (OK) | | | ASSIGNMENTS=0 |
|---|---|---|---|
| MOBILE STATION | M1 | M2 | |
| SIGNAL LEVEL | L'11 | L'12 | |
| BIT ERROR RATE | E'11 | E'12 | |

| BS2 BUFFER (OK) | | | ASSIGNMENTS=1 |
|---|---|---|---|
| MOBILE STATION | M1 | M3 | |
| SIGNAL LEVEL | L21 | L23 | |
| BIT ERROR RATE | E21 | E23 | |

| SS2 BUFFER (OK) | | | | ASSIGNMENTS=0 |
|---|---|---|---|---|
| MOBILE STATION | M1 | M2 | M3 | |
| SIGNAL LEVEL | L'21 | L'22 | L'23 | |
| BIT ERROR RATE | E'21 | E'22 | E'23 | |

| P-SAT BUFFER (OK) | ASSIGNMENTS=0 |
|---|---|
| MOBILE STATION | |
| SIGNAL LEVEL | |
| BIT ERROR RATE | |

| S-SAT BUFFER (OK) | ASSIGNMENTS=0 |
|---|---|
| MOBILE STATION | |
| SIGNAL LEVEL | |
| BIT ERROR RATE | |

| ASSIGNMENT BUFFER 44 | | | |
|---|---|---|---|
| MOBILE STATION | M1 | M2 | M3 |
| | BS1 | BS1 | BS2 |

| CONTROL PROGRAM 42 |
|---|

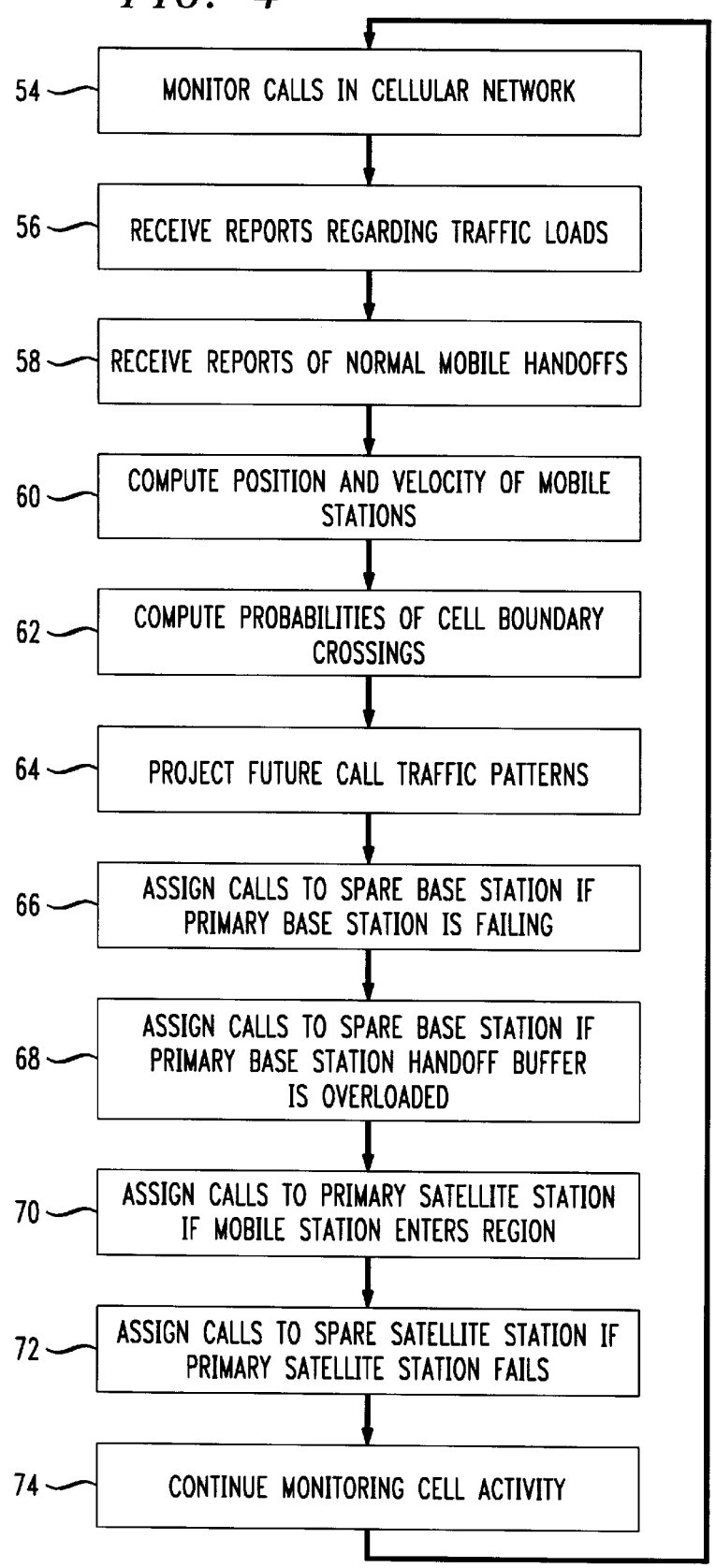

FIG. 5

MEMORY 36

| BS1 BUFFER (OVERLOADED) | | | ASSIGNMENTS=1 |
|---|---|---|---|
| MOBILE STATION | M1 | M2 | |
| SIGNAL LEVEL | L11 | L12 | |
| BIT ERROR RATE | E11 | E12 | |

| SS1 BUFFER (OK) | | | ASSIGNMENTS=1 |
|---|---|---|---|
| MOBILE STATION | M1 | M2 | |
| SIGNAL LEVEL | L'11 | L'12 | |
| BIT ERROR RATE | E'11 | E'12 | |

| BS2 BUFFER (OK) | | | ASSIGNMENTS=1 |
|---|---|---|---|
| MOBILE STATION | M1 | M3 | |
| SIGNAL LEVEL | L21 | L23 | |
| BIT ERROR RATE | E21 | E23 | |

| SS2 BUFFER (OK) | | | ASSIGNMENTS=1 |
|---|---|---|---|
| MOBILE STATION | M1 | M2 | M3 |
| SIGNAL LEVEL | L'21 | L'22 | L'23 |
| BIT ERROR RATE | E'21 | E'22 | E'23 |

| P-SAT BUFFER (OK) | ASSIGNMENTS=0 |
|---|---|
| MOBILE STATION | |
| SIGNAL LEVEL | |
| BIT ERROR RATE | |

| S-SAT BUFFER (OK) | ASSIGNMENTS=0 |
|---|---|
| MOBILE STATION | |
| SIGNAL LEVEL | |
| BIT ERROR RATE | |

| ASSIGNMENT BUFFER 44 | | | |
|---|---|---|---|
| MOBILE STATION | M1 | M2 | M3 |
| | BS1 | SS1 | BS2 |

| CONTROL PROGRAM 42 |
|---|

FIG. 6

MEMORY 36

| BS1 BUFFER (OVERLOADED) | | | ASSIGNMENTS=1 |
|---|---|---|---|
| MOBILE STATION | M1 | M2 | |
| SIGNAL LEVEL | L11 | L12 | |
| BIT ERROR RATE | E11 | E12 | |

| SS1 BUFFER (OK) | | | ASSIGNMENTS=1 |
|---|---|---|---|
| MOBILE STATION | M1 | M2 | |
| SIGNAL LEVEL | L'11 | L'12 | |
| BIT ERROR RATE | E'11 | E'12 | |

| BS2 BUFFER (FAILED) | | | ASSIGNMENTS=0 |
|---|---|---|---|
| MOBILE STATION | M1 | M3 | |
| SIGNAL LEVEL | L21 | L23 | |
| BIT ERROR RATE | E21 | E23 | |

| SS2 BUFFER (OK) | | | ASSIGNMENTS=3 |
|---|---|---|---|
| MOBILE STATION | M1 | M2 | M3 |
| SIGNAL LEVEL | L'21 | L'22 | L'23 |
| BIT ERROR RATE | E'21 | E'22 | E'23 |

| P-SAT BUFFER (OK) | ASSIGNMENTS=0 |
|---|---|
| MOBILE STATION | |
| SIGNAL LEVEL | |
| BIT ERROR RATE | |

| S-SAT BUFFER (OK) | ASSIGNMENTS=0 |
|---|---|
| MOBILE STATION | |
| SIGNAL LEVEL | |
| BIT ERROR RATE | |

| ASSIGNMENT BUFFER 44 | | | |
|---|---|---|---|
| MOBILE STATION | M1 | M2 | M3 |
| | SS1 | SS1 | SS2 |

| CONTROL PROGRAM 42 |
|---|

FIG. 7

MEMORY 36

| BS1 BUFFER (OVERLOADED) | | | ASSIGNMENTS=1 |
|---|---|---|---|
| MOBILE STATION | M1 | M2 | |
| SIGNAL LEVEL | L11 | L12 | |
| BIT ERROR RATE | E11 | E12 | |

| SS1 BUFFER (OK) | | | ASSIGNMENTS=1 |
|---|---|---|---|
| MOBILE STATION | M1 | M2 | |
| SIGNAL LEVEL | L'11 | L'12 | |
| BIT ERROR RATE | E'11 | E'12 | |

| BS2 BUFFER (FAILED) | | ASSIGNMENTS=0 |
|---|---|---|
| MOBILE STATION | M1 | |
| SIGNAL LEVEL | L21 | |
| BIT ERROR RATE | E21 | |

| SS2 BUFFER (OK) | | | ASSIGNMENTS=2 |
|---|---|---|---|
| MOBILE STATION | M1 | M2 | |
| SIGNAL LEVEL | L'21 | L'22 | |
| BIT ERROR RATE | E'21 | E'22 | |

| P-SAT BUFFER (OK) | | ASSIGNMENTS=1 |
|---|---|---|
| MOBILE STATION | M3 | |
| SIGNAL LEVEL | LS3 | |
| BIT ERROR RATE | ES3 | |

| S-SAT BUFFER (OK) | | ASSIGNMENTS=0 |
|---|---|---|
| MOBILE STATION | M3 | |
| SIGNAL LEVEL | L'S3 | |
| BIT ERROR RATE | E'S3 | |

| ASSIGNMENT BUFFER 44 | | | |
|---|---|---|---|
| MOBILE STATION | M1 | M2 | M3 |
| | SS2 | SS1 | P-SAT |

| CONTROL PROGRAM 42 |
|---|

CELLULAR NETWORKS WITH SPARE BASE AND SATELLITE STATIONS

FIELD OF THE INVENTION

This invention relates to improving the performance and reliability of a cellular network by selectively introducing spatial redundancy therein.

BACKGROUND OF THE INVENTION

Mobile cellular networking has become increasingly commercially important because it offers enhanced performance and flexibility for many kinds of information transfer, including multimedia traffic. A mobile cellular network provides such services for a geographical area, which is divided into cells that each encompass particular geographical sections of the service area. A base station is deployed in and associated with each cell. The base stations of various cells are connected by a wireline network and are controlled by a control station using the wireline network. The control station provides the necessary computing and communication processing required to manage the network of base stations deployed throughout the service area.

Each base station services all the mobile stations within the cell surrounding the base station with desirable radio frequency (RF) signal strength. As used herein, "mobile station" is defined to include portable cellular telephones, automobile telephones, laptop and palmtop computers, personal digital assistant (PDA) equipment with wireless modems, TDMA and CDMA transceivers, pagers, and other, perhaps larger, voice and data communicating devices. The base station in each cell has a certain fixed number of radio communication channels which it can assign to calls in progress within that cell. A mobile station ordinarily communicates with the base station in the cell in which it is located over one of these radio communication channels.

The individual cells tile the entire geographical service area, but the tiling is not exact and neighboring cells overlap to form handoff regions. According to conventional practice, when a mobile station crosses the boundary of the current cell and moves into another cell while transmitting information, a communication path must be established with a new base station located in the new cell. If radio communication channels are not available in the new cell and the mobile station is not able to acquire a new channel in the new cell and relinquish its channel in its old cell before it has crossed over the boundary and moved completely into the new cell, a handoff failure has occurred and the call in progress is aborted. The probability of handoff failure, that is, the probability that a mobile call in progress will be forcibly aborted during a handoff because it could not be allocated a radio communication channel in the new cell, is a major criterion for evaluating the quality of a cellular network system. Accordingly, minimizing the probability of handoff failure is desirable in any cellular network system.

In order to minimize the probability of handoff failures, an effective mobile cellular network ought to continuously decide how best to allocate the limited set of available radio communication channels in a cell to new calls originating within the cell and handoffs that migrate into the cell from neighboring cells. This task is impeded by the inability of the base station located in a cell to handle all the new calls originating within the cell as well as the handoffs that migrate into the cell from neighboring cells. The state of mobile cellular networking could be advanced and the probability of handoff failures and transmission errors could be substantially minimized if there were a better way to handle overloading of a base station with excessive communication with mobile stations and if better warnings that a mobile station will soon enter a new cell were issued to the base station located in and associated with the new cell.

SUMMARY OF THE INVENTION

By employing spatial redundancy in a mobile cellular network in accordance with the principles of the invention, transmission errors as well as handoff failure are substantially minimized. Redundantly deployed spare base stations are introduced along with the primary base station at a central area of each cell in the cellular network. The redundantly deployed spare base stations handle new calls when the associated primary base station is overloaded, participate in retransmission of data lost due to degraded channel conditions and congestion in the network, and assist in handoffs.

Satellite stations are deployed in certain regions that are marked by hills or valleys to compensate for signal strength lost due to fading and augment the communicative capabilities of the primary and spare base stations. Such regions can span several cells of the network. The satellite stations prevent breaks in the "line of sight" between a base station and a mobile station when the mobile station moves around hills or through a valley, which reduces the likelihood of communication "outages".

In an illustrative embodiment of the invention, a cellular network includes a control station and a network of cells through which one or more mobile stations can move. The control station controls operation of the cellular network and provides a communication path between the network of cells and the public switched telephone network. A primary base station located in, and associated with, each of the network of cells communicates with the control station and with mobile stations within the associated cell over a number of radio communication channels. A spare base station deployed along with the primary base station in each cell monitors its own cell and adjacent cells and is able to communicate with one or more mobile stations roving in the network of cells. A primary satellite station and a spare satellite station in reserve for failure or overloading of the primary satellite station are deployed in a region characterized by uneven terrain resulting from hills, tall buildings, etc., spanning a number of cells in order to boost the communicative capabilities of the cellular network, and make the cellular network more robust. Each of the primary and spare satellite stations is dedicated to supervise the cells within its coverage region. As one or more mobile stations move through the network of cells, the deployed base and satellite stations generate reports. The control station determines the position and velocity of the mobile stations roving in the network of cells based on the reports. The control station is able to determine that a particular mobile station, which is making a call associated with that particular mobile station, is about to cross a boundary between a first cell and a second cell, and if it is determined that the primary base station located in the second cell has failed, is overloaded, or likely will become overloaded, the assignment of the call can be changed to a spare base station deployed in the second cell, rather than the primary base station. The assignment of the call can subsequently be changed from the spare base station to another station at a later time. The base and satellite stations continue to monitor cell activity, report their results to the control station, and issue warnings of impending handoffs.

When another mobile station enters the region characterized by uneven terrain, the occurrence of which can be indicated by signal strength and other data, the control station hands off a call associated with the other mobile station from a primary base station to the primary satellite station deployed in the region. The cellular network is made even more robust with the spare satellite station deployed in the region as a back-up for the primary satellite station.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 3 illustrates the memory in the control station depicted in FIG. 2 after a first stage of cell activity;

FIG. 4 is a flow diagram of a control program running in the control station depicted in FIG. 2;

FIG. 5 illustrates the memory depicted in FIG. 2 after a second stage of cell activity;

FIG. 6 illustrates the memory depicted in FIG. 2 after a third stage of cell activity; and FIG. 7 illustrates the memory depicted in FIG. 2 after a fourth stage of cell activity.

DETAILED DESCRIPTION

For a better understanding of the invention, together with other and further objects, advantages, and capabilities thereof, reference is made to the following disclosure and drawing figures. For clarity of explanation, the illustrative embodiments of the present invention are presented as comprising individual functional blocks. The functions these blocks represent may be provided through the use of either shared or dedicated hardware, including, but not limited to, hardware capable of executing software. Illustrative embodiments may comprise digital signal processor (DSP) hardware, read-only memory (ROM) for storing software performing the operations discussed below, and random-access memory (RAM) for storing DSP results. Very large scale integration (VLSI) hardware embodiments, as well as custom VLSI circuitry in combination with a general purpose DSP circuit, may also be provided.

Transmission errors and handoff failures are substantially minimized by redundantly pairing spare base stations along with primary base stations at a central area of each cell in a cellular network, and by deploying a primary satellite station paired with a spare satellite station at strategic locations throughout the cellular network. In the exemplary network of cells depicted in FIG. 1, each cell 10 includes a primary base station 12 and a spare base station 14 positioned at a central area of the cell. Each primary and spare base station is equipped with an omni-directional antenna to provide coverage for cell activity in that cell and adjacent cells. Placing the spare base station with the primary base station at the center of the cell reduces the need for additional on-ground wiring to the control station.

The spare base stations handle new calls when a primary base station is, or likely will become, overloaded, participate in retransmission of data lost due to degraded channel conditions and network congestion, and assist in handoffs in either a passive or active mode. Each spare base station can "listen" and quietly monitor activities in adjacent cells. When handoff error occurs as a mobile station moves into a new cell, rather than the current primary base station transfer signaling to a new primary base station the spare base station provides uninterrupted services for the information transfer; and then, later on, when the mobile station is well within the new cell, the spare base station can hand over the control to the primary base station associated with the new cell.

When a spare base station operates in a passive mode, it "listens" using its omni-directional antenna, quietly monitors activities in all cells in its coverage area and informs the control station about the current load of adjacent cells. The spare station jumps in whenever there is a need for help, thereby providing fault-tolerance and improved performance.

Figure 1:
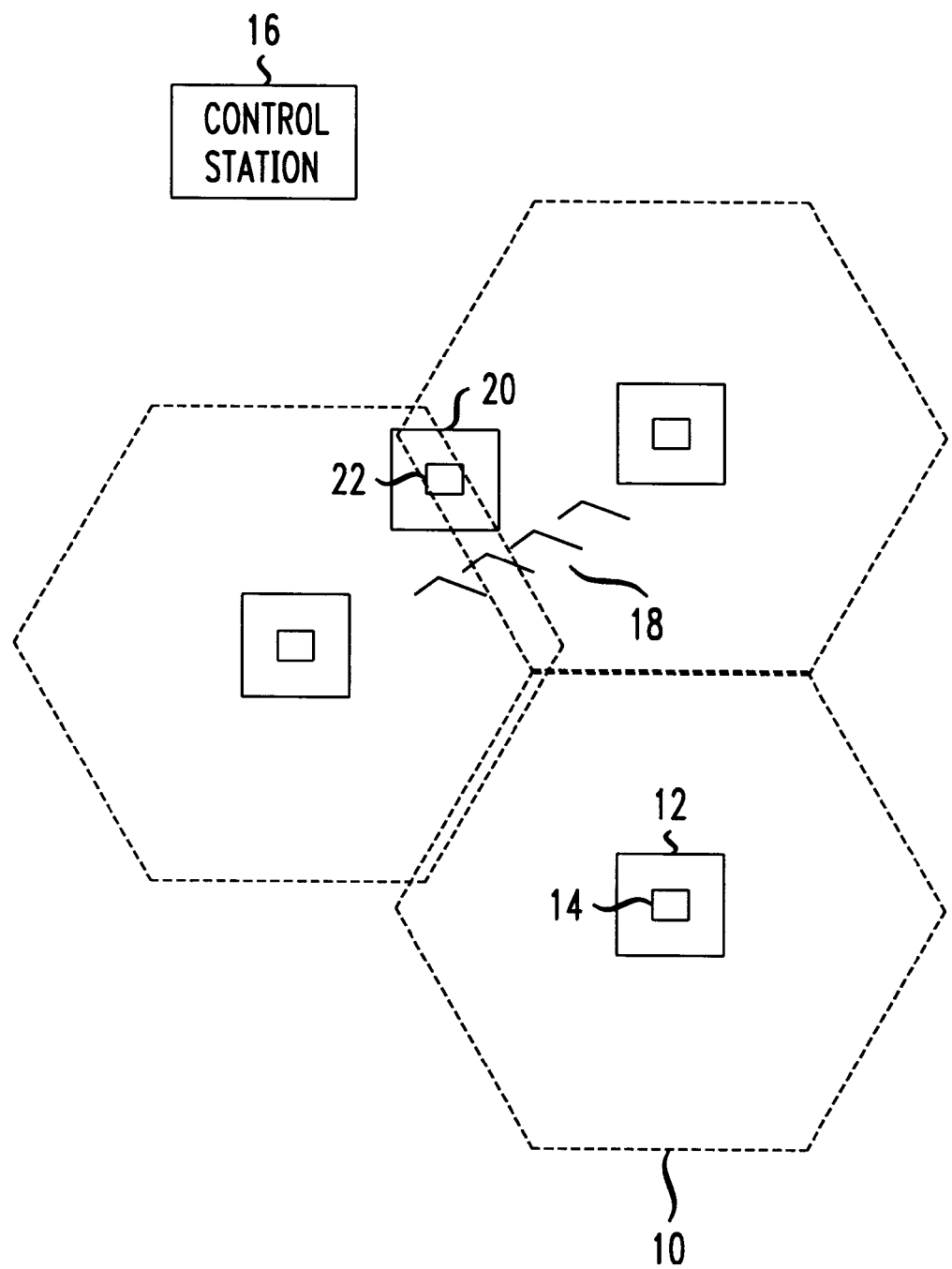
FIG. 1 illustrates a cellular network including a control station and a network of cells, each cell having a primary base station and a spare base station deployed at a central area thereof.

Referring to FIG. 1, the control station 16 monitors calls in the network, determines and predicts traffic patterns and the probability of cell boundary crossings, and issues warnings with respect to anticipated resource demand. If a fault occurs in a primary base station, or if the handoff buffer for a primary base station is above a predefined threshold, the spare base station will serve as an additional base station to support new calls.

Any hole in the coverage of a cell due to blockage of transmission caused by hills 18 or large buildings is filled by satellite stations selectively introduced throughout the cellular network topology. Referring to FIG. 1, the satellite stations are deployed in pairs of primary 20 and spare 22 satellite stations in troublesome regions. The principles of the invention are applicable to analog, digital and PCS cellular networks for voice and data.

Figure 2:
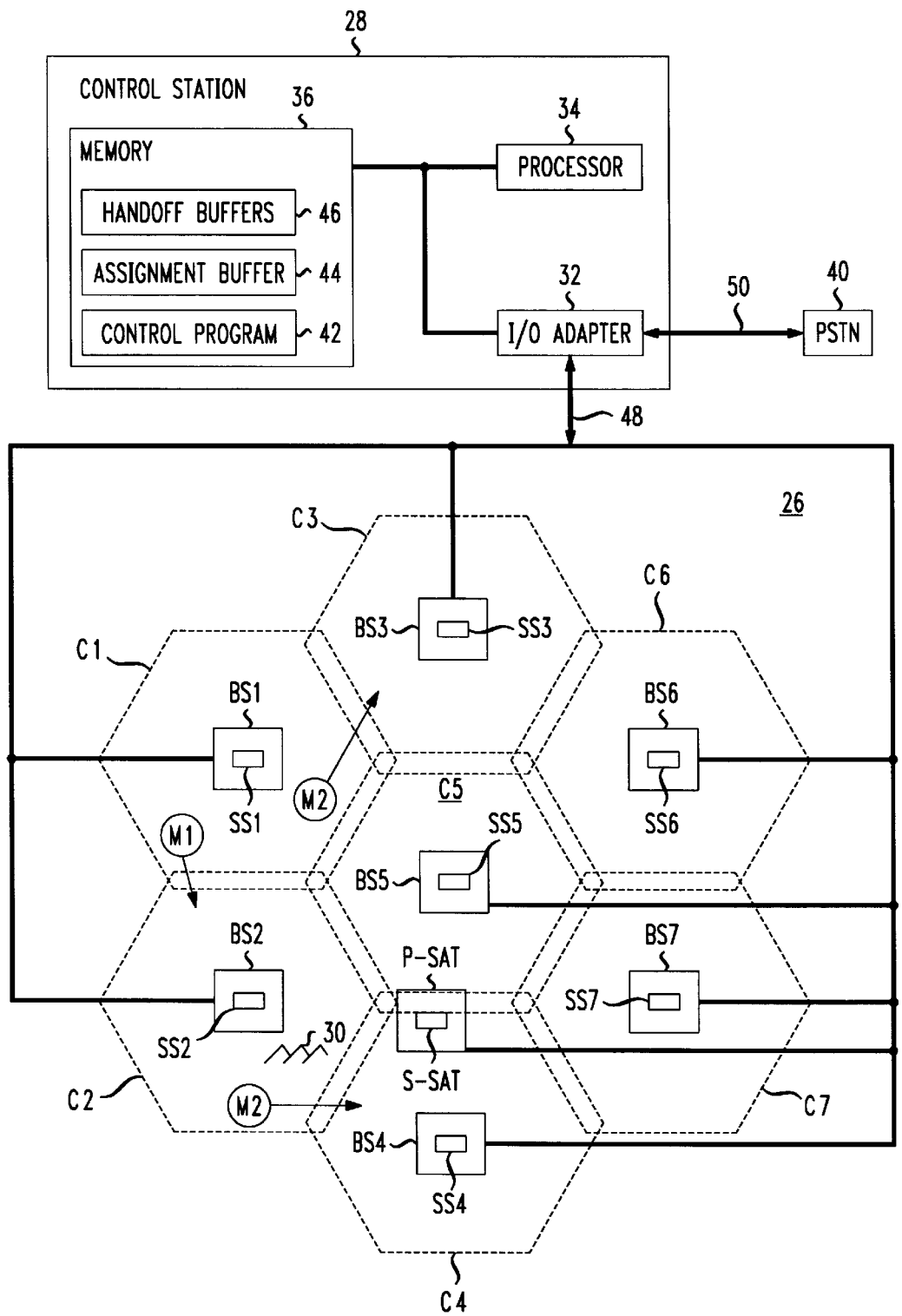
FIG. 2 illustrates a cellular network including a control station and a network of cells with base and satellite stations monitoring cell activity and reporting their results to the control station.

Referring to FIG. 2, an exemplary mobile cellular network in accordance with a specific embodiment of the invention comprises a network of cells 26 and a control station 28. The network of cells 26 in this exemplary embodiment includes a first cell C1, a second cell C2, a third cell C3, a fourth cell C4, a fifth cell C5, a sixth cell C6, and a seventh cell C7. The first cell C1 includes a first primary base station BS1 and a first spare base station SS1. The second cell C2 includes a second primary base station BS2 and a second spare base station SS2. The third cell C3 includes a third primary base station BS3 and a third spare base station SS3. The fourth cell C4 includes a fourth primary base station BS4 and a fourth spare base station SS4. The fifth cell C5 includes a fifth primary base station BS5 and a fifth spare base station SS5. The sixth cell C6 includes a sixth primary base station BS6 and a sixth spare base station SS6. The seventh cell C7 includes a seventh primary base station BS7 and a seventh spare base station SS7.

While one spare base station is deployed per cell in the preferred embodiment of the invention, the degree of spatial redundancy employed in the cellular network can be adjusted according to the invention. Less than one spare base station can be deployed per cell; that is, a spare base station can be deployed in a region encompassing a plurality of the network of cells. For example, the cellular network can include a single spare base station deployed in the middle of a hexagonal configuration of seven cells, such as in the fifth cell C5 shown in FIG. 2. This lower degree of redundancy offers cost savings, but provides less reliability. If there is one spare base station deployed for several cells (e.g., so that the spare base station is deployed in the middle of the hexagonal configuration), each spare base station should have higher transmitting power and a more sensitive receiver in order to "overlook" the larger coverage area.

In especially rugged terrain having many hills and valleys, communications between mobile stations and base stations are often impeded and degraded, resulting in interruptions and outages. Another aspect of the invention, deploying redundantly paired satellite stations, helps to prevent such communication outages. The satellite stations are selectively introduced throughout the cellular network topology to fill any hole in the coverage of a cell due to blockage of transmission caused by hills 30 or tall buildings. The satellite stations are deployed in pairs of primary and spare satellite stations at the same location to avoid excessive wiring requirements. In such a pair, the primary satellite station P-SAT augments the communicative capability of the primary and spare base stations and is usually deployed to cover several cells. The spare satellite station S-SAT is deployed in the region as a back-up for the primary satellite station P-SAT.

The control station 28 includes an input/output (I/O) adapter 32, a processor 34, a memory 36, and a bus 38. The input/output (I/O) adapter 32 is in communication with the public switched telephone network (PSTN) 40, and with the primary base station and the spare base station of each of the network of cells 26, and the pair of satellite stations, through a landline in the form of a backbone. The processor 34 is coupled to the I/O adapter 32 and to the memory 36 through the bus 38. The memory 36 is in communication with the I/O adapter 32 through the bus 38. The memory 36 stores a control program 42, which runs in the control station 28. The memory 36 includes an assignment buffer 44, and for each of the cells in the network of cells that are being monitored by the control station, and for each of the pair of satellite stations, a handoff buffer 46.

By way of example, and not limitation, FIG. 3 schematically depicts within the memory 36 a BS1 handoff buffer section, an SS1 handoff buffer section, a BS2 handoff buffer section, an SS2 handoff buffer section, a P-SAT handoff buffer section, and an S-SAT handoff buffer section for purposes of describing this illustrative embodiment of the invention. The assignment buffer 44 indicates the current assignment of particular mobile stations to particular primary or spare base stations, or to either of the satellite stations depicted according to this specific embodiment of the invention. Each handoff buffer section (for BS1, SS1, BS2, SS2, P-SAT, and S-SAT) shown in FIG. 3 indicates a current record of how many mobile stations are assigned to the particular base or satellite station. Each of the handoff buffer sections depicted in FIG. 3 stores and updates data according to the control program 42. Each of the buffers in the memory 36 is used for monitoring and storing data in respect to one or more mobile stations. Each of the buffers stores a label (e.g., M1, M2, . . . etc.) for the one or more mobile stations with which it communicates and stores a signal level and a bit error rate, for each of the one or more mobile stations, as shown in FIG. 3.

Referring to FIG. 2, the cellular network is controlled by the control station 28 as the base and satellite stations monitor cell activity and report their results to the control station 28. According to the example depicted by FIG. 2, three mobile stations are moving through the network 26 of seven cells. The three mobile stations include a first mobile station M1, a second mobile station M2, and a third mobile station M3. Mobile station M1 and mobile station M2 are shown in the first cell C1. The third mobile station M3 is shown in the second cell C2.

As illustrated in FIG. 3, mobile station M1 is in communication with the first primary base station BS1, the first spare base station SS1, the second primary base station BS2, and the second spare base station SS2. Mobile station M2 is in communication with the first primary base station BS1, the first spare base station SS1, and the second spare base station SS2. Mobile station M3 is in communication with the second primary base station BS2 and the second spare base station SS2.

The assignment buffer 44 depicted in FIG. 3 shows that mobile station M1 is assigned to primary base station BS1. Mobile station M2 is assigned to primary base station BS1 as shown by the assignment buffer 44. Mobile station M3 is assigned to primary base station BS2.

In FIG. 3, buffer section BS1 shows that primary base station BS1 is "OK" (i.e., that it has not failed or become overloaded). Buffer section BS1 also shows that two mobile stations are currently assigned to primary base station BS1. Buffer section SS1 shows in FIG. 3 that spare base station SS1 is OK (it has not failed or become overloaded) and that zero mobile stations are currently assigned to spare base station SS1. Buffer section BS2 shows in FIG. 3 that primary base station BS2 is OK and that one mobile station is currently assigned to primary base station BS2. Buffer section SS2 shows that spare base station SS2 is presently OK and that zero mobile stations are currently assigned to spare base station SS2. Buffer section P-SAT shows that the primary satellite station P-SAT is OK and that zero mobile stations are currently assigned to primary satellite station P-SAT. Buffer section S-SAT shows that the spare satellite station S-SAT is OK and that zero mobile stations are currently assigned to spare satellite station S-SAT.

Referring to FIG. 2, the processor 34 within the control station 28 runs the control program 42 stored in the memory 36. The processor 34 controls data going into and out of the control station 28 through the I/O adapter 32 on communication line 48 and communication line 50. FIG. 4 is a flow diagram of the control program 42 running in the control station 28.

Referring to FIG. 4, the control program 42 includes a set of instructions which, when executed by the processor 34, cause the control station 28 to continuously perform the following sequence of steps and repeat those steps during operation according to the control program 42. While base and satellite stations monitor cell activity in the network of cells 26 and send reports to the control station 28 through the communication line 48 coupled to the I/O adapter 32, the control station 28 monitors calls in the cellular network in step 54. The control station 28 receives reports regarding traffic loads in step 56. The control station 28 receives reports of normal mobile handoffs in step 58. The position and velocity of mobile stations are computed based on signal levels and bit error rates in step 60. The probabilities of cell boundary crossings are computed in step 62. Future call traffic patterns are projected in step 64. If a primary base station is failing, calls are assigned to a spare base station in step 66. If a primary base station handoff buffer is or likely will become overloaded, calls are assigned to a spare base station in step 68. If a mobile station enters a region of uneven terrain serviced by a primary satellite station, the mobile station is assigned to the primary satellite station in step 70. If the primary satellite station fails, or will become overloaded, the mobile station is assigned to the spare satellite station in step 72. The base and satellite stations continue to report to the control station 28, which continues to monitor calls in the cellular network in step 74, whereupon the sequence of steps is repeated according to control program 42.

Referring to FIG. 3, the buffer section for primary base station BS1 shows that primary base station BS1 is in communication with mobile station M1 and mobile station M2. The buffer section for spare base station SS1 shows that spare base station SS1 is in communication with mobile station M1 and mobile station M2. The buffer section for primary base station BS2 shows that primary base station BS2 is in communication with mobile station M1 and mobile station M3. The buffer section for spare base station SS2 shows that the spare base station SS2 is in communication with mobile station M1, mobile station M2, and mobile station M3. The buffer section for primary satellite station P-SAT shows that primary satellite station P-SAT is not in communication with any of the mobile stations. The buffer section for spare satellite station S-SAT shows that spare satellite station S-SAT is not in communication with any of the mobile stations. Assignment buffer 44 shows that mobile station M1 is assigned to primary base station BS1, mobile station M2 is assigned to primary base station BS1, and mobile station M3 is assigned to primary base station BS2.

One of the benefits of the spatial redundancy provided by the invention is that the spare base stations can handle a handoff as a mobile station traverses a boundary between cells. Also, the spare base stations can take over primary communication with a mobile station when a primary base station fails. For example, if primary base station BS1 becomes overloaded while handling mobile station M2, the control station 28 is able to assign the mobile station M2 to spare base station SS1. If primary base station BS2 fails as the first mobile station M1 traverses the boundary between the first cell C1 and the second cell C2, the control station 28 can, for example, assign the first mobile station M1 to spare base station SS2 instead of primary base station BS2.

Referring to FIG. 5, the mobile station M2 is in communication with the primary base station BS1, the spare base station SS1, and the spare base station SS2. The buffer section for spare base station SS1 shows that spare base station SS1 is in communication with the mobile station M2. The buffer section for spare base station SS2 indicates that spare base station SS2 is in communication with mobile station M2. The buffer section for primary base station BS1 indicates that primary base station BS1 becomes overloaded. Based on the relative signal strengths and bit error rates for communication of spare base station SS1 and spare base station SS2 with mobile station M2, the control station 28 assigns mobile station M2 to spare base station SS1.

Referring to FIG. 5, the assignment buffer 44 shows that the control station 28, because primary base station BS1 became overloaded, has assigned mobile station M2 to spare base station SS1. The buffer section for spare base station SS1 shows an increase (as compared to FIG. 3) from zero to one in the number of current assignments in response to mobile station M2 now being assigned to spare base station SS1. Whereas the buffer section for primary base station BS1 shows a decrease (as compared to FIG. 3) in the number of current assignments for primary base station BS1 by one mobile station from two to one.

Referring to FIG. 6, the buffer section for primary base station BS2 indicates that primary base station BS2 fails. Because primary base station BS2 has failed, when mobile station M1 traverses the boundary between the first cell C1 and the second cell C2 as depicted in FIG. 2 and enters the second cell C2 the control station 28 assigns the first mobile station M1 to spare base station SS2 instead of primary base station BS2. Also when primary base station BS2 fails the control station 28 assigns mobile station M3 from primary base station BS2 to spare base station SS2.

Referring to FIG. 6, the assignment buffer 44 shows that the control station 28 has assigned mobile station M1 to spare base station SS2 and assigned mobile station M3 to spare base station SS2 because of the failure of primary base station BS2. The buffer section for spare base station SS2 shows an increase from one to three (as compared to FIG. 5) in the number of current assignments in response to mobile station M1 and mobile station M3 now being assigned to spare base station SS2. The buffer section for primary base station BS2 shows a decrease in the number of current assignments for primary base station BS2 from one to zero (as compared to FIG. 5).

Deployment of spare base stations throughout the network of cells 26 helps to ensure constant communication with mobile stations. Upon the failure of a primary base station, spare base stations can pick up the slack so that mobile stations can still communicate with the PSTN 40. When a primary base station becomes overloaded, or likely will become overloaded, from excessive communication with mobile stations a redundantly deployed spare base station can assume control of communication with one or more mobile stations to prevent overloading of the primary base station. The control station 28 performs a continuing monitoring process to detect impending handoffs, failures of primary base stations, and overloading of primary base stations in order to manage the cellular network in accordance with the principles of the invention.

When mobile station M3 moves behind the hills 30 as depicted in cell C2 in FIG. 2, communication between mobile station M3 and spare base station SS2 is blocked and impeded by the hills 30. The control station 28 senses this condition such as by a comparison of signal levels and/or bit error rates, and based on the position and velocity of mobile station M3. Referring to FIG. 7, in response to this condition the assignment of mobile station M3 is changed from spare base station SS2 to primary satellite station P-SAT which is dedicated to cover a region at least partially defined by cell C2, cell C4, and cell C5.

Referring to FIG. 7, mobile station M3 is in communication with the primary satellite station P-SAT and the spare satellite station S-SAT, which are deployed together as a pair to cover the region marked by uneven terrain. The buffer section for primary satellite station P-SAT shows that primary satellite station P-SAT is in communication with mobile station M3. The buffer section for spare satellite station S-SAT shows that spare satellite station S-SAT is in communication with mobile station M3. The assignment buffer 44 shows that mobile station M3 has been assigned to primary satellite station P-SAT because it moved behind the hills and out of the "line of sight" of spare base station SS2. One of the advantages provided by the invention is that if primary satellite station P-SAT fails, the control station 28 is able to change assignment of mobile station M3 to the redundantly deployed spare satellite station S-SAT so that communication with the PSTN 40 is maintained.

From the foregoing it will be appreciated that the spare base stations introduced strategically throughout the cellular network are able to retransmit data packets lost due to network congestion or high error rates, handle new calls when a primary base station is overloaded, and assist in handoffs; and also that the principles of the invention are applicable to analog, digital, and PCS cellular networks.

While several particular forms of the invention have been illustrated and described, it will also be apparent that various modifications can be made without departing from the spirit and scope of the invention.

What is claimed is:

1. A cellular network, comprising:
   a network of cells through which one or more mobile stations can move;
   a control station communicatively coupled to the network of cells;
   a primary base station, which can communicate with one or more of the mobile stations, deployed in each of the network of cells;
   a spare base station, which can communicate with one or more of the mobile stations, deployed in each of the network of cells;
   a primary satellite station, which augments the primary and spare base stations, deployed to cover a region within the network of cells; and
   a spare satellite station, which augments the primary satellite station, deployed in said region.

2. A cellular network as defined in claim 1, further comprising:
   a programmable processor within the control station, wherein said processor is programmed to execute the step of:
      assigning a call associated with a mobile station from one of the primary base stations to one of the spare base stations.

3. A cellular network as defined in claim 1, further comprising:
   a memory within the control station.

4. A cellular network as defined in claim 3, further comprising:
   a control program stored in the memory.

5. A cellular network as defined in claim 3, wherein:
   the memory comprises an assignment buffer, a primary base station handoff buffer for each deployed primary base station, and a spare base station handoff buffer for each deployed spare base station.

6. A cellular network as defined in claim 4, wherein said control program comprising a set of instructions, which when performed by a processor, cause the processor to execute a series of steps comprising:
   assigning a call associated with a mobile station from one of the primary base stations to one of the spare base stations.

7. A cellular network as defined in claim 1, wherein:
   the primary and spare base stations are deployed in a central area of each of the network of cells.

8. A cellular network as defined in claim 1, wherein:
   said region is defined by a plurality of the network of cells.

9. A method of routing a call, for use in a cellular network comprising a network of cells having a primary base station deployed in each of the network of cells, the method comprising the steps of:
   deploying a spare base station along with each primary base station in a central area of each of the network of cells;
   monitoring a call assigned to a particular one of the primary base stations and associated with a mobile station;
   issuing a warning that the mobile station will cross a boundary between cells of the network; and
   changing the assignment of said call from said particular one of the primary base stations to a particular spare base station based on the warning.

10. A method as defined in claim 9, further comprising the step of:
    determining the position and velocity of the mobile station.

11. A method as defined in claim 9, further comprising the step of:
    determining the assignment of the call based on a signal level and a bit error rate.

12. A method as defined in claim 9, further comprising the step of:
    receiving a report from a spare base station deployed in one of the network of cells.

13. A method as defined in claim 9, further comprising the step of:
    changing the assignment of the call from said particular spare base station to a second primary base station.

14. A method as defined in claim 9, further comprising the step of:
    deploying at least one spare base station in each of the network of cells.

15. A method as defined in claim 9, further comprising the step of:
    deploying a primary satellite station to cover a region within the network of cells, said primary satellite station augmenting the primary and spare base stations deployed in the network of cells.

16. A method as defined in claim 15, further comprising the step of:
    deploying a spare satellite station in said region, said spare satellite station augmenting said primary satellite station.

17. A method as defined in claim 9, wherein:
    a plurality of spare base stations are deployed in one cell.

18. A method as defined in claim 9, wherein:
    a plurality of spare satellite stations are deployed per cell.

19. A method as defined in claim 9, wherein:
    a plurality of primary base stations are covered by a lesser number of spare base stations.

20. A method as defined in claim 9, wherein:
    a plurality of primary satellite stations are covered by a lesser number of spare satellite stations.

* * * * *